Patented Sept. 1, 1942

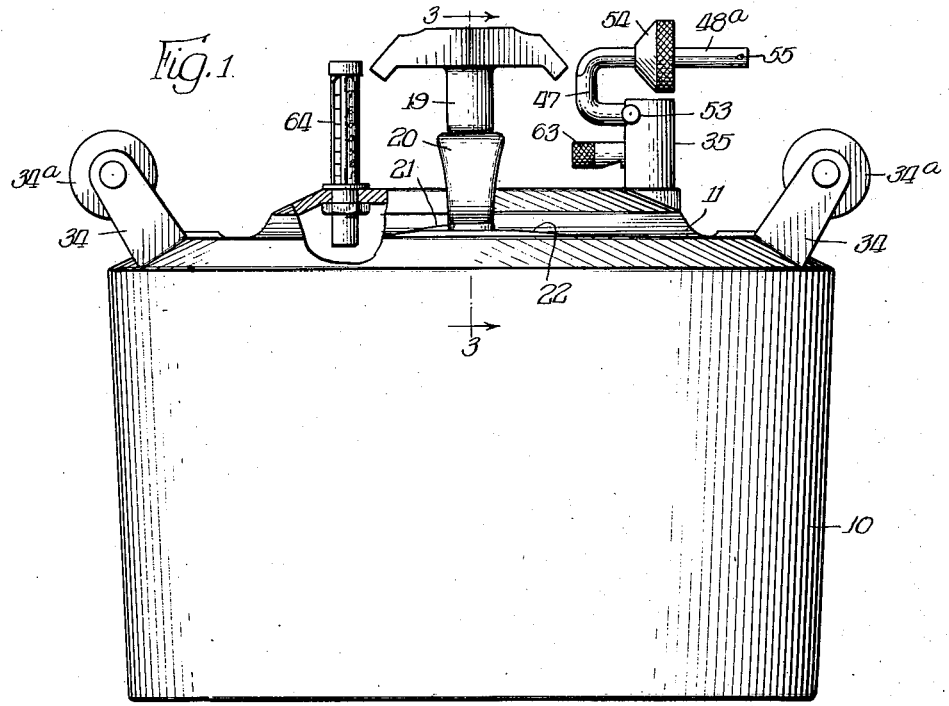
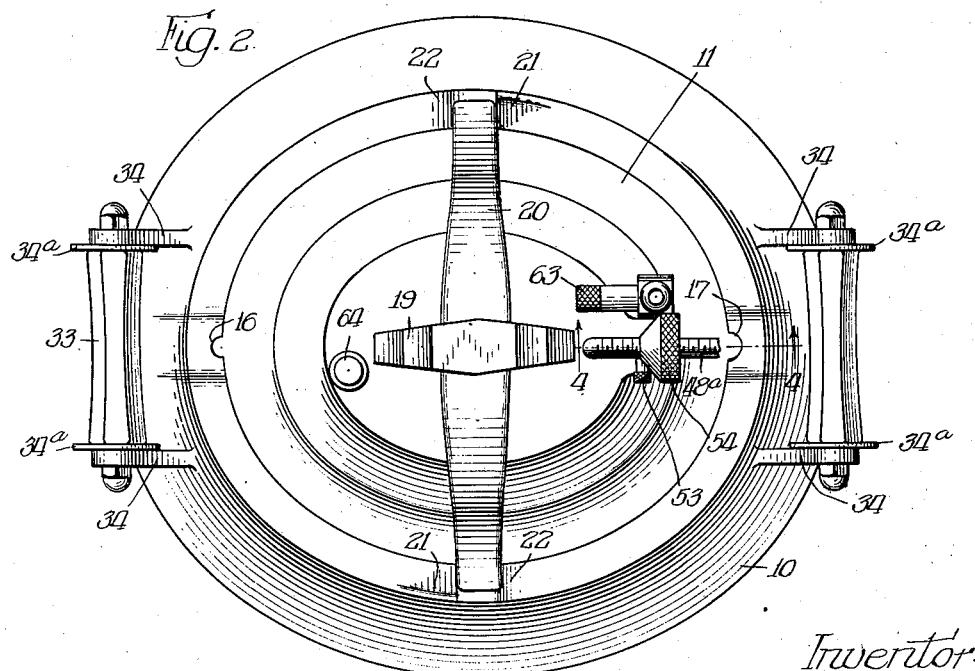

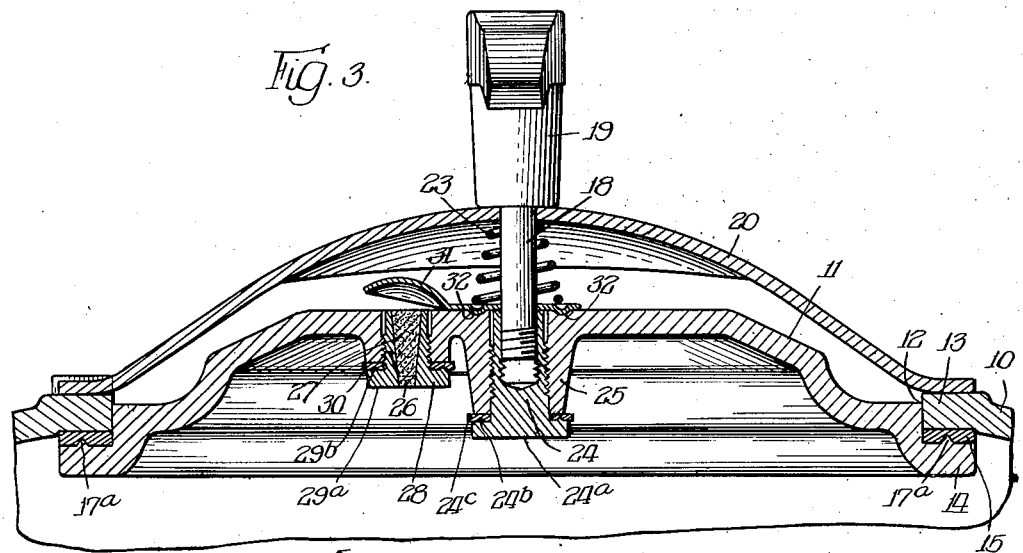
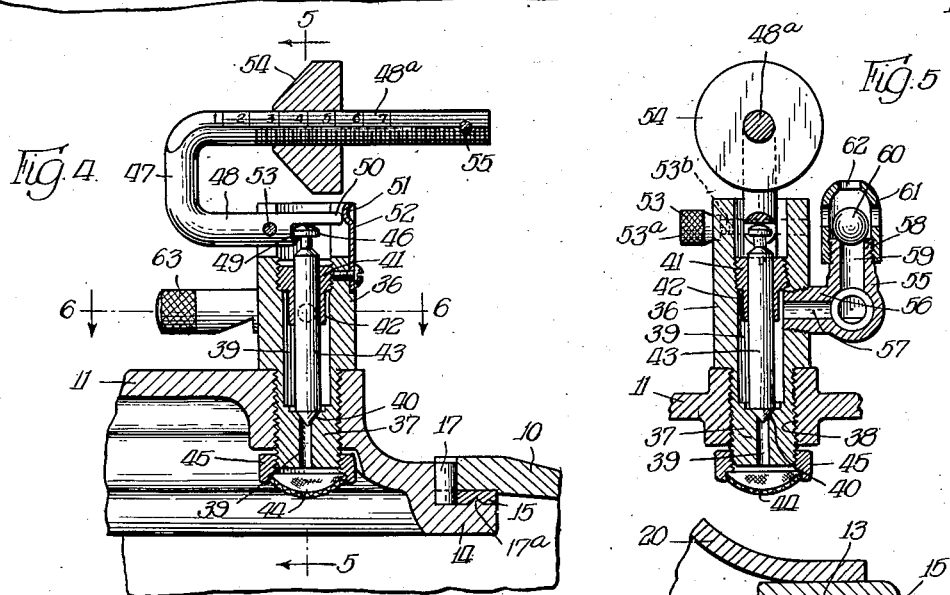
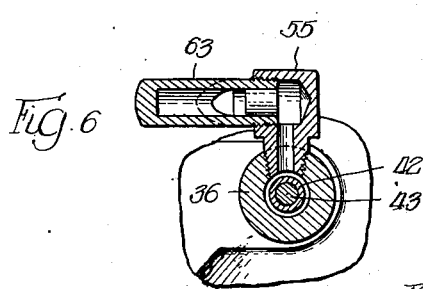

2,294,746

UNITED STATES PATENT OFFICE 2,294,746

VALVE MEANS FOR PRESSURE COOKERS

Erik G. Grundstrom, Chicago, Ill., assignor to Advance Aluminum Castings Corp., Chicago, Ill., a corporation of Illinois Application March 8, 1939, Serial No. 260,464

3 Claims. (Cl. 137—53)

The present invention relates to improvements in valve means for pressure cookers.

This application is a continuation in part of application Serial No. 118,881, filed January 2, 1937, by the present applicant.

The description of the present invention may be prefaced by the statement that in pressure cookers a vessel containing the material to be cooked is tightly sealed and heated to a sufficiently high temperature to cause the generation of steam either from the moisture of the material being cooked or from other liquid contained within said vessel. After a predetermined pressure has been attained, the vessel may be removed from the source of heat and the material therein subjected to temperature and pressure conditions for a predetermined length of time.

An object is to provide a valve for a pressure cooker which may be readily assembled and disassembled for convenience of cleaning, packing and shipping.

A further object is to provide an improved valve for a pressure cooker, which valve has associated therewith a warning whistle and a protective by-pass for said whistle.

A further obect is to provide a warning signal which will operate efficiently throughout the entire range of pressures for which the pressure cooker is designed to operate.

Further objects will appear as the description proceeds.

Referring to the drawings—

Figure 1 is a view in side elevation of one embodiment of the present invention;

Figure 2 is a top plan view of the structure shown in Figure 1;

Figure 3 is a sectional view on an enlarged scale taken along the plane indicated by the arrows 3—3 of Figure 1;

Figure 4 is a sectional view on an enlarged scale taken along the plane indicated by the arrows 4—4 of Figure 2;

Figure 5 is a sectional view taken along the plane indicated by the arrows 5—5 of Figure 4;

Figure 6 is a sectional view taken along the plane indicated by the arrows 6—6 of Figure 4; and Figure 7 is a fragmentary view on an enlarged scale illustrating an improved sealing means for the cover of the cooker.

The numeral 10 indicates a vessel. Said vessel 10 is provided with the elliptical opening 12 bounded by the flange 13. The cover 11 is provided with a flange 14 adapted to underlie the flange 13, the gasket 15 being provided between said flange 14 and said flange 13. As shown in Figure 2, the cover 11 is provided with a protuberance 16, preferably located at one extremity of the long axis of said cover, adapted to fit into a corresponding recess in the adjacent portion of the vessel 10. Said cover 11 at the other extremity of its long axis is provided with a protuberance 17 fitting into a corresponding recess in the vessel 10. Said protuberances 16 and 17 are preferably of different sizes, so that the operator of the pressure cooker will be guided by said protuberances in placing the cover 11 in proper position relative to the vessel 10. The gasket 15 is recessed to correspond to the protuberances 16 and 17. The flange 14 on its upper surface is provided with a bead 17a extending around the cover, which bead is adapted to embed itself into the gasket 15 when pressure is exerted between the flanges 13 and 14, as will be explained presently, thereby greatly improving the sealing action of the gasket 15. A further advantage of the bead 17a is that, since the gasket 15 will in service receive a more or less permanent indentation from the bead 17a, said bead and said indentation will constitute indicating means to insure the same setting of the gasket 15 with reference to the flange 14 at all times. Particularly in cooperation with the protuberances 16 and 17, the flanges 13 and 14 and the gasket 15 will always have the same setting relative to one another, thereby avoiding the faults of some gaskets that after they lose their original resilience they lose their efficiency due to the fact that it is not possible to always reset them in correct relationship with reference to the members between which they are to perform their sealing functions.

Mounted centrally of the cover 11 is the upstanding threaded stud 18 having a handle 19 fixed to its upper extremity. Said handle 19 is preferably of heat insulating material, whereby the cover 11 and the vessel 10 may be readily manipulated. Underlying said handle 19 is the spring 20 rotatable about the stud 18 and having two extremities adapted to bear against the upper surface of the flange 13 of the vessel 10. Said extremities of said spring 20 are adapted to abut against abutments 21—21 formed integral with said flange 13 of the vessel 10. The upper surface of the flange 13 adjacent to the abutments 21—21 may be slightly raised, as indicated by the numerals 22—22, whereby as the spring 20 is turned away from its operative position as shown in Figure 1, said spring 20 will be quickly released without binding or unnecessary scratching of the surface of the flange 13.

The stud 18, which carries the handle 19, is screwthreaded within the cover 11, and a spring 23 is provided between the upper side of the cover 11 and the under side of the spring 20 for holding the extremities of the spring 20 away from the cover 11 when said cover is removed from the vessel 10. The spring 23, by holding the member 20 against the lower extremity of the handle 19, facilitates the handling of the entire cover assembly, as the distance between the cover and the lower extremity of the handle 19 will vary considerably. The handle 19 and its stud 18 are threaded into the nut 24, which nut is externally threaded within the boss 25 extending downwardly from the under side of the cover 11. The upper surface of the head 24a of the nut 24 is provided with the circular head 24b adapted to embed itself into the gasket 24c.

The numeral 26 indicates as a whole a fuse plug carried by the cover 11. Said fuse plug includes the fusible element 27 mounted within the plug member 28, which plug member 28 is externally screw-threaded and is adapted to be mounted within a correspondingly tapped hole in the cover 11. The plug member 28 is provided with the head 29a, by means of which the fuse plug 26 may be screwed tightly into position. The tapped hole in the cover is tapped only at its lower end, and the plug member 28 is threaded only adjacent to the head 29a, and accordingly it is impossible to screw in the fuse plug 26 from the wrong direction. A gasket 30 is provided between the head 29a and the cover 11 for providing a tight joint. The upper surface of the head 29a will be provided with an annular bead 29b, which will become embedded in the gasket 30 to provide a tight seal without requiring excessive tightening effort on said plug 26. As clearly shown in Figure 3, the fusible element 27 is tapered, the larger extremity thereof being uppermost. By reason of this construction, in the event that an excessive temperature is developed in the cooker, the fusible element 27 will first soften and be released from the plug member 28, permitting the escape of steam from within the vessel 10. By reason of this construction the melting of the fusible element 27 is avoided.

The numeral 31 indicates a shield covering the upper extremity of the hole in which the plug 26 is mounted. Said shield is releasably held in position by means of the spring 23 and is releasably held relative to said hole by a pair of struck out portions 32—32 adapted to seat within corresponding recesses in the upper side of the cover 11. By reason of the shield 31, in the event that the fusible element 27 is released, juices and other fluid materials within the vessel 10 will be prevented from spurting over the region adjacent to the vessel 10, but will be deflected and merely flow downwardly on the cover 11 and along the sides of the vessel 10.

As shown in Figures 1 and 2, the vessel 10 may be provided with a pair of handles 33—33, which may be of heat insulating material, each of said handles being supported by a pair of lugs 34—34 integral with the vessel 10. At the two ends of each of the handles 33—33 on the inner sides of the lugs 34—34 are the guard disks 34a—34a of heat insulating material, which protect the hands of the operator from contact with the hot metal lugs 34—34.

The numeral 35 indicates as a whole a valve, which forms the present invention. Under normal operation the vessel 10 with its cover 11 form a tightly sealed enclosure, steam generated therein being prevented from escape except through said valve 35.

The valve in the illustrated embodiment of the present invention includes the stem 36 having the reduced threaded end portion 37. Said threaded end portion 37 is adapted to project through an opening 38 in the cover 11. Said valve stem 36 including its reduced end portion 37 has tight sealing engagement with the cover 11, whereby no fluid may escape therebetween. Preferably said stem 36 will be so tightly secured to the cover 11 that it will not be removable by the user, so that no difficulties will be encountered in service by leakage around said stem. The stem 36 is provided with the axial bore 39, the lower extremity of which is reduced in diameter to provide a valve seat 40. The upper portion of the stem 36 is internally screw-threaded for the reception of the nut 41 provided with the depending skirt 42, which nut 41 and skirt 42 provide an elongated bearing for the longitudinally reciprocable valve member 43. Said valve member 43 is adapted to seat by gravity in the valve seat 40, thereby controlling communication between the interior of the vessel 10 and the outside atmosphere. The lower extremity of the bore 39 may be protected by the screen 44, which screen is mounted within the nut 45 adapted to have screw-threaded engagement with the lower extremity 37 of the valve stem 36.

The present invention contemplates a novel method of forming the valve seat for the valve member 43. Said valve member will be provided with an end surface which is as near to a true cone as is practicable to manufacture. Said valve member will preferably be made of hard material, such as Monel metal. The seat 40 of the stem 36 will be made of brass and is accordingly relatively soft. The valve seat for the valve member 43 is formed by tapping the end of valve member 43 while it is being rotated so that a truly conical seat is provided.

The upper extremity of the valve member 43 is provided with the head 46 adapted to cooperate with the lever arm 47. Said lever arm 47 in the illustrated embodiment of the present invention comprises a J-shaped member, including the legs 48 and 48a, the leg 48 of which has a bifurcated end. One of the bifurcations, indicated by the numeral 49, seats under the head 46 of the valve member 43. The other of said bifurcations, indicated by the numeral 50, is adapted to be engaged by the valve member 43 when said valve member is raised by steam pressure within the cooker. Said bifurcation 50 is also adapted to engage under a struck out portion 51 of a leaf spring 52 secured to said valve stem 36. Said lever 47 is swingingly mounted upon the valve stem 36 by means of the pin 53. Said pin 53 is provided with the knurled bead 53a and an adjacent threaded portion 53b threaded into the adjacent part of the stem 36. The distant extremity of the pin 53 acts merely as a pilot pin. By reason of this construction, if the pin 53 should be broken, no difficulties will be encountered in replacing said pin. The leg 48a of the lever is threaded for the reception of a weight 54, which is provided with a threaded hole. The outer extremity of the leg 48a is provided with the cross pin 55 for preventing the escape of the weight 54 from said leg 48a. Said leg 48a is provided with indicia disposed along its length acting as markers for positioning the weight 54.

Mounted upon the valve stem 36 and having communication with the axial bore 39 thereof is the assembly 55, which includes a warning whistle and also a relief valve. Said assembly includes the externally screw-threaded stem 56 threaded into the valve stem 36, which stem 56 is provided with the bore 57. Said assembly 55 is also provided with the upstanding externally screw-threaded stem 58 provided with the axial bore 59. Said stem 59 provides a seat for the ball valve 60. Housing said ball valve 60 is the cap 61 internally screw-threaded to cooperate with the external screw-threads of the stem 58. Said cap 61 is provided with the apertures 62—62. Threaded into the fitting 55 is the whistle 63, which may take the conformation of whistles well known in the art. Said whistle 63 provides a path for communication between the interior of the vessel and the outside atmosphere. The numeral 64 indicates a thermometer for indicating the temperature within the cooker. This thermometer will be marked with indicia along its length to correspond with the indicia disposed along the length of the leg 48a. By reason of the relationship between temperature and pressure, there can be a direct relationship between the indicia on said leg 48a and on the thermometer 64.

The mode of operation of the above described embodiment of the present invention is substantially as follows: The operator of the cooker will place the materials to be cooked within the vessel 10 and will then insert the cover 11, fitting the protuberances 16 and 17 within their corresponding recesses and turning the handle 19, thereby swinging the extremities of the spring 20 above the raised surfaces 22—22 until said extremities abut against the abutments 21—21. The operator will continue to turn the handle 19 to bring the flange 14 of the cover 11 with its gasket 15 into close engagement with the under side of the flange 13 of the vessel 10. By reason of the protuberances 16 and 17, the turning of the handle 19 will not cause the jamming of the cover 11 into the material of the vessel 10. An easy fit may be provided for said cover 11 within the vessel 10. The operator will then place the vessel upon a source of heat and will adjust the weight 54 to a predetermined position on the lever arm 47. As pointed out above, the leg 48a of said lever arm 47 will be calibrated with indicia whereby the operator may so place the weight 54 as to cause the valve member 43 to lift when a predetermined pressure is reached within the cooker.

As the temperature rises within the cooker, steam will be generated within the vessel 10 until the pressure thereof is sufficient to force upwardly the valve member 43. Upon the attainment of such pressure, the head 46 of said valve member 43 will engage the under side of the bifurcation 50 of the lever 47, swinging said lever about the axis of the pin 53. Under these circumstances steam will escape past the valve member 43 into the assembly 55. Part of said steam will escape through the whistle 63, giving a warning to the operator. In the event of excess steam pressure within the vessel 10, the ball valve 60 will be raised, thereby limiting the pressure upon the whistle 63 and maintaining the pressure upon said whistle 63 at such a value that it will operate efficiently.

According to practice which is at present preferred, the operator, when the first warning has been sounded by the whistle 63, will turn the weight 54 out to the extremity of the leg 48a of the lever 47, whereby the effect of said weight 54 will be a maximum. The operator at this time will remove the cooker from the source of heat. Under these conditions the pressure within the cooker will be maintained for a prolonged period of time. After the cooker has been removed from the source of heat and the material therein has been subjected to the existing temperature and pressure conditions within the cooker for a predetermined period of time, which period can be readily determined by simple experimentation with different materials being cooked, the operator will tilt the leg 48a, thereby raising the bifurcation 50 above the struck out portion 51 of the spring 52. This action will result in lifting the valve member 43 by reason of the engagement of the bifurcation 49 under the head 46 of said valve member 43. The valve member 43 will be held in its position, permitting the escape of steam from within the cooker. As indicated above, the provision of the ball valve 60 will prevent the application of excessive pressures to the whistle 63 and will limit said pressures to those which will produce the desired tone in said whistle 63. When the steam has escaped from the cooker, the cover 11 may be readily removed by backing off the tension on the spring 20, lowering the cover slightly and swinging it to allow passage of said cover through the elliptical opening in the vessel 10.

By reason of the fact that the weight 54 is threaded upon the leg 48a of the lever 47, a positive setting of said weight 54 may be had without danger of slippage. The spring 52 has the decided advantage that after the materials to be cooked have been subjected to the desired pressure for the desired period of time, the steam may be positively and completely released, to the end that the cover may be readily removed from the vessel.

The provision of the ball valve 60 has the advantage that the whistle 63 may be small enough to operate on low pressures but will be protected against excessive pressures. It need not be explained that the ordinary whistle will not operate properly at both low and high pressures. The ball valve 60 has the function of maintaining a predetermined pressure on the whistle, as well as to expedite the release of pressure within the cooker when the operator desires to open the cooker.

The operator of the cooker, either by reading instructions or by experience, will know that when she sets the weight 54 at any one of the indicia on the leg 48a, the valve member 43 should lift in a certain number of minutes to produce the desired results. If the thermometer 64 indicates that the temperature (and consequently the pressure) within the closed cooker is rising too slowly or too rapidly, the operator will adjust the source of heat accordingly to effect the accomplishment of the desired pressure (and temperature) at the end of the proper length of time. Moreover, it is frequently desirable to hold a pressure within the cooker for a predetermined length of time after said pressure has been attained. The operator may turn the weight out toward the outer end of the leg 48a, and, observing the thermometer 64, she may adjust the source of heat to maintain said pressure.

Though a preferred embodiment of the present invention has been described in detail, many modifications will occur to those skilled in the art. It is intended to cover all such modifications that fall within the scope of the appended claims.

What is claimed is:

1. A valve including, in combination, a housing having a valve seat and a reciprocable valve member biased to closing position upon said seat, a J-shaped lever hingedly supported by said housing, one leg of said J-shaped lever being provided with bifurcations, said valve member having a head portion adapted to be lifted by one of said bifurcations, said head portion being adapted to engage the other of said bifurcations to swing said lever as the valve opens, said other leg of said lever being provided with a weight adjustably mounted thereupon for varying the valve closing force of said lever, said valve being provided with means for holding said lever releasably in lifted position.

2. A valve including, in combination, a housing having a valve seat and a reciprocable valve member biased to closing position upon said seat, a J-shaped lever hingedly supported by said housing, one leg of said J-shaped lever being provided with bifurcations, said valve member having a head portion adapted to be lifted by one of said bifurcations, said head portion being adapted to engage the other of said bifurcations to swing said lever as the valve opens, said other leg of said lever being provided with a weight adjustably mounted thereupon for varying the valve closing force of said lever, said valve being provided with means for holding said lever releasably in lifted position, a pin for providing a hinged connection between said housing and said lever, said pin having a finger grip portion and a threaded portion adjacent to said finger grip portion, the distant extremity of said pin constituting a pilot portion.

3. A valve for a pressure cooker comprising, in combination, a housing, a reciprocable valve member within said housing biased to closing position, a pressure responsive whistle connected with said housing to provide an exit from said housing when said valve member is in unbiased position, and means providing an auxiliary exit from the interior of said housing, said last mentioned means being provided with a valve member biased to closed position, said second mentioned valve member being movable independently of movement of said first mentioned valve member and being located in a position to by-pass said whistle whereby to limit the pressure applied to said whistle to the end that said whistle may be small enough to operate on low pressures but will be protected against excess pressures.

ERIK G. GRUNDSTROM.